(12) United States Patent
Song et al.

(10) Patent No.: US 12,278,750 B1
(45) Date of Patent: Apr. 15, 2025

(54) SYSTEM AND METHOD FOR ESTIMATING E2E DELAY AMONG BLOCKCHAIN NODES OVER P2P NETWORKS

(71) Applicant: POSTECH Research and Business Development Foundation, Pohang-si (KR)

(72) Inventors: Hwang Jun Song, Pohang-si (KR); Seung Gyu Ji, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 33 days.

(21) Appl. No.: 18/511,886

(22) Filed: Nov. 16, 2023

(30) Foreign Application Priority Data

Sep. 21, 2023 (KR) .......................... 10-2023-0126521

(51) Int. Cl.
*H04L 43/0864* (2022.01)
*H04L 67/104* (2022.01)

(52) U.S. Cl.
CPC ........ *H04L 43/0864* (2013.01); *H04L 67/104* (2013.01)

(58) Field of Classification Search
CPC ............... H04L 43/0864; H04L 67/104; H04L 67/1061; H04L 67/16; H04L 67/18; H04L 65/408

USPC .......................................................... 709/224
See application file for complete search history.

(56) References Cited

U.S. PATENT DOCUMENTS

| | | | |
|---|---|---|---|
| 11,082,482 B2 | 8/2021 | Frankel et al. | |
| 11,576,139 B2 | 2/2023 | Manolakos et al. | |
| 11,665,231 B1 | 5/2023 | Song et al. | |
| 2020/0175003 A1* | 6/2020 | Jiang | G06Q 20/027 |
| 2020/0205104 A1 | 6/2020 | Akkarakaran et al. | |
| 2020/0296680 A1 | 9/2020 | Akkarakaran et al. | |
| 2022/0201056 A1* | 6/2022 | Zajac | H04L 65/612 |
| 2023/0291476 A1* | 9/2023 | Lee | H04B 10/11 |
| 2023/0353247 A1* | 11/2023 | Lee | H04B 10/503 |

* cited by examiner

*Primary Examiner* — Glenford J Madamba
(74) *Attorney, Agent, or Firm* — Morgan, Lewis & Bockius LLP

(57) ABSTRACT

Provided is a system and method for estimating an end-to-end delay between blockchain nodes in peer-to-peer (P2P) networks. The system includes a coordinate system construction unit configured to designate an origin node and anchor nodes among participating nodes having a distributed ledger of P2P networks, construct a first coordinate system of a predetermined dimension by exchanging control messages between the origin node and the anchor nodes and the participating nodes, and construct a second coordinate system of another predetermined dimension and a dimension determination unit configured to determine a dimension to be applied to the current P2P networks by comparing dimension-specific delays or control message overheads of the first coordinate system and the second coordinate system.

18 Claims, 10 Drawing Sheets

SYSTEM AND METHOD FOR ESTIMATING E2E DELAY AMONG BLOCKCHAIN NODES OVER P2P NETWORKS

CLAIM FOR PRIORITY

This application claims priority to Korean Patent Application No. 2023-0126521 filed on Sep. 21, 2023 in the Korean Intellectual Property Office (KIPO), the entire contents of which are hereby incorporated by reference.

BACKGROUND

1. Technical Field

Example embodiments of the present disclosure relate to a network delay estimation technology, and more particularly, to scalable and accurate system and method for estimating an end-to-end (E2E) delay among large-scale blockchain nodes over peer-to-peer (P2P) networks.

2. Related Art

Blockchain systems are decentralized and distributed ledgers, in which it is almost impossible to tamper with stored data. Since blockchain systems are safe and transparent and provided in a distributed manner, they have been gaining significant attention in recent years due to their potential to revolutionize various industries. Cryptocurrency is one of the most popular blockchain applications.

Recently, blockchain-based non-fungible tokens (NFTs) have been rapidly emerging in online marketplaces and creating a new value paradigm. Blockchain applications of various services require a high level of scalability. However, it is very difficult to implement a secure and highly scalable blockchain in a decentralized environment, which is known as the blockchain trilemma. Therefore, blockchain systems are designed for their purposes by sacrificing some of the attributes.

For example, blockchain systems are classified into two types: permissionless blockchains which are focused on decentralization by partially sacrificing scalability and permissioned blockchains of which scalability is enhanced by partially sacrificing decentralization. A permissionless blockchain is a completely distributed blockchain that anyone may join and generate a new block. Bitcoin and Ethereum are widespread permissionless blockchains.

However, in these blockchains, the scalability has been sacrificed, which can lead to a 51% attack, and the blockchain performance can be limited especially in large-scale network environments. Considerable research efforts have been devoted to improving the scalability of permissionless blockchains.

For example, there are suggestions of a Byzantine Agreement protocol that could confirm transaction quickly and safely by using pure proof of stake (PPoS) approaches, and a scalable off-chain framework for Ethereum that aims to increase the transaction throughput and reduce fees by creating child chains that can process transactions independently and periodically settle the results on the main chain. Also, there is a suggestion of a protocol that incorporates the advantages of a directed acyclic graph (DAG) and traditional blockchains to achieve scalability and fast transaction processing.

In a permissioned blockchain such as Hyperledger Fabric, Corda, and Quorum, only authorized nodes are allowed to participate in the blockchain network. Unlike permissionless blockchain, the 51% attack is not a significant threat because all nodes are believed to be trustable, and their access is controlled by an administrator. Thus, the consensus process of permissioned blockchains can be simplified compared to permissionless blockchains. Consequently, transactions are quickly committed to the distributed ledgers without the need for computation-intensive mining tasks.

However, the decentralization issue can still arise in a permissioned blockchain. To solve the decentralization problem of permissioned blockchains according to the related art, it is necessary to reduce security threats to a system dependent on a centralized service provider or protect on-chain personal information. For the former goal, an execution architecture for reliable blockchain as a service (BaaS) may be proposed, and for the latter goal, a blockchain support auditing framework is introduced. In the blockchain support auditing framework, a smart contract is modeled for safe storage audit.

Also, the Hyperledger Fabric working group is trying to specify and standardize an interoperability workflow which allows service providers hosted in different clouds to build and join business networks independently of infrastructure.

In this way, performance of both permissionless and permissioned blockchains is largely related to network latency, particularly block broadcasting and consensus achievement. For example, a block propagation delay seriously affects the consistency of a blockchain network and increases a ratio of old blocks and blockchain forks. For this reason, transactions per second (TPS) decrease, and security and fairness problems may arise.

Peer-to-peer (P2P) networks may operate as a blockchain backbone network. However, any one pair of nodes may be logically connected through P2P networks, and thus $O(N^2)$ control messages may be theoretically necessary to measure an E2E delay value between blockchain nodes. It is well known that the E2E delay value varies within a relatively large range, and the connection may be vulnerable due to a condition of the P2P networks.

This represents that measuring of all E2E delays between blockchain nodes is a heavy load in network management. Accordingly, accurately estimating a network delay with a small amount of control message overhead in a P2P network environment which varies over time is an important element for effectively solving a blockchain problem.

Thus far, some research has been carried out on estimating an E2E delay through P2P networks. For example, there is a suggestion of global network positioning (GNP) which is a coordinate-based network distance estimation method of modeling the Internet as a geometric space. In this method, however, it is difficult to select optimal referencing nodes without geographic information. Also, it is difficult to effectively cope with changes in the network states of nodes in a P2P network environment.

As an example, there is a suggestion of a Vivaldi algorithm for allocating synthetic coordinates to an Internet host in a distributed manner without fixed network infrastructure. In this method, however, there is considerable difference between a measured delay and an estimated delay. Also, since each node independently constructs its own coordinate system, a large amount of control message overhead is necessary, and convergence is very slow compared to a condition of P2P networks which varies over time.

As an example, there is a suggestion of a method of introducing Pharos control for improving the accuracy of the Vivaldi algorithm by allocating multi-coordinates to each node according to measure of a network distance range.

However, this method involves a large amount of control message overhead to construct a coordinate system.

As an example, there is a suggestion of a method of processing triangle inequality violations (TIV) through an existing algorithm by dividing an entire space into three clusters and configuring subspaces. According to this method, it is necessary to know a cluster to which a node belongs, and a large amount of control message overhead is required.

As described above, a network delay affects TPS and scalability of a blockchain. Also, due to a high risk of a security problem, a network delay remains as a major obstacle to blockchain performance. Therefore, a new method of estimating E2E delays between multiple blockchain nodes with a control message overhead level of O(N) in P2P networks is necessary.

SUMMARY

Accordingly, example embodiments of the present disclosure are provided to substantially obviate one or more problems due to limitations and disadvantages of the related art.

Example embodiments of the present disclosure provide a system and method for accurately estimating edge-to-edge (E2E) delays between all blockchain nodes with O(N) control message overhead.

Example embodiments of the present disclosure also provide an E2E delay estimation system and method for detecting a change of a network state in a peer-to-peer (P2P) network environment which varies over time, and effectively managing coordinates applied to each blockchain node.

In some example embodiments, a system for estimating an E2E delay between blockchain nodes in P2P networks includes a coordinate system construction unit configured to designate an origin node and anchor nodes among participating nodes having a distributed ledger of P2P networks, construct a first coordinate system of a predetermined dimension by exchanging control messages between the origin node and the anchor nodes and the participating nodes, and construct a second coordinate system of another predetermined dimension and a dimension determination unit configured to determine a dimension to be applied to the current P2P networks by comparing dimension-specific delays of the first coordinate system and the second coordinate system.

Control message exchange between the origin node and a validation node including the coordinate system construction unit and the dimension determination unit may be performed using a first control message, control message exchange between the validation node and the anchor nodes may be performed using the first control message, and control message exchange between the anchor nodes and the participating nodes may be performed using a second control message.

The first control message may include information representing a dimension, information representing a node index, information representing an event type, and information representing the number of referencing nodes.

The event type may be used for distinguishing between a control message for coordinate system construction and a control message for coordinate system management.

The second control message may include information representing a message type and information representing a dimension.

The system may further include a coordinate system management unit configured to request coordinate values thereof in the current P2P networks from the origin node after the coordinate systems are constructed, and update coordinate values of the origin node when new coordinate values received from the origin node have a difference of a reference value or more from previous coordinate values.

In other example embodiments, a method of estimating an E2E delay between blockchain nodes in P2P networks includes setting, by a validation node, a first participating node among a plurality of participating nodes which are blockchain nodes as an orderer node or an origin node, transmitting first referencing node information to a plurality of anchor nodes selected from among the plurality of participating nodes, receiving coordinate values and E2E delay measurement values from the plurality of anchor nodes, transmitting second referencing node information to third participating nodes not belonging to the origin node or the plurality of anchor nodes among the plurality of participating nodes, receiving coordinate values and E2E delay measurement values from the third participating nodes, calculating a first control message overhead for a preset first dimensional coordinate system constructed on the basis of the coordinate values and the E2E delay measurement values received from the plurality of anchor nodes and the third participating nodes, calculating a second control message overhead for a second dimensional coordinate system different from the first dimensional coordinate system constructed on the basis of the coordinate values and the E2E delay measurement values received from the plurality of anchor nodes and the third participating nodes, and determining a dimension of an E2E delay estimation coordinate system to be applied to the current P2P networks by comparing the first control message overhead with the second control message overhead.

The method may further include requesting coordinate values of the validation node in the current P2P networks from the origin node after the coordinate systems are constructed, and updating coordinate values of the origin node when new coordinate values received from the origin node have a difference of a reference value or more from previous coordinate values.

In other example embodiments, a system for estimating an E2E delay between blockchain nodes in P2P networks includes a memory in which at least one instruction is stored and a processor connected to the memory and configured to perform the at least one instruction.

According to the at least one instruction, the processor performs operations of: setting one (e.g., "first participating node") of a plurality of participating nodes which are blockchain nodes as an orderer node or an origin node, transmitting first referencing node information to a plurality of anchor nodes selected from among the plurality of participating nodes, receiving coordinate values and E2E delay measurement values from the plurality of anchor nodes, transmitting second referencing node information to third participating nodes not belonging to the origin node or the plurality of anchor nodes among the plurality of participating nodes, receiving coordinate values and E2E delay measurement values from the third participating nodes, calculating a first control message overhead for a preset first dimensional coordinate system constructed on the basis of the coordinate values and the E2E delay measurement values received from the plurality of anchor nodes and the third participating nodes, calculating a second control message overhead for a second dimensional coordinate system different from the first dimensional coordinate system constructed on the basis of the coordinate values and the E2E delay measurement values received from the plurality of anchor nodes and the third participating nodes, and determining a dimension of an E2E delay estimation coordinate system to be applied to the current P2P networks by comparing the first control message overhead with the second control message overhead.

The processor may perform control message exchange between a validation node and the origin node through a first control message and perform control message exchange between the validation node and the anchor nodes through the first control message. Here, control message exchange between the anchor nodes and the participating nodes may be performed using a second control message having a different format from the first control message.

The processor may further perform an operation of requesting coordinate values thereof in the current P2P networks from the origin node after the coordinate systems are constructed, and updating coordinate values of the origin node when new coordinate values received from the origin node have a difference of a reference value or more from previous coordinate values.

BRIEF DESCRIPTION OF DRAWINGS

Example embodiments of the present disclosure will become more apparent by describing example embodiments of the present disclosure in detail with reference to the accompanying drawings, in which.

DESCRIPTION OF EXAMPLE EMBODIMENTS

Figure 1:
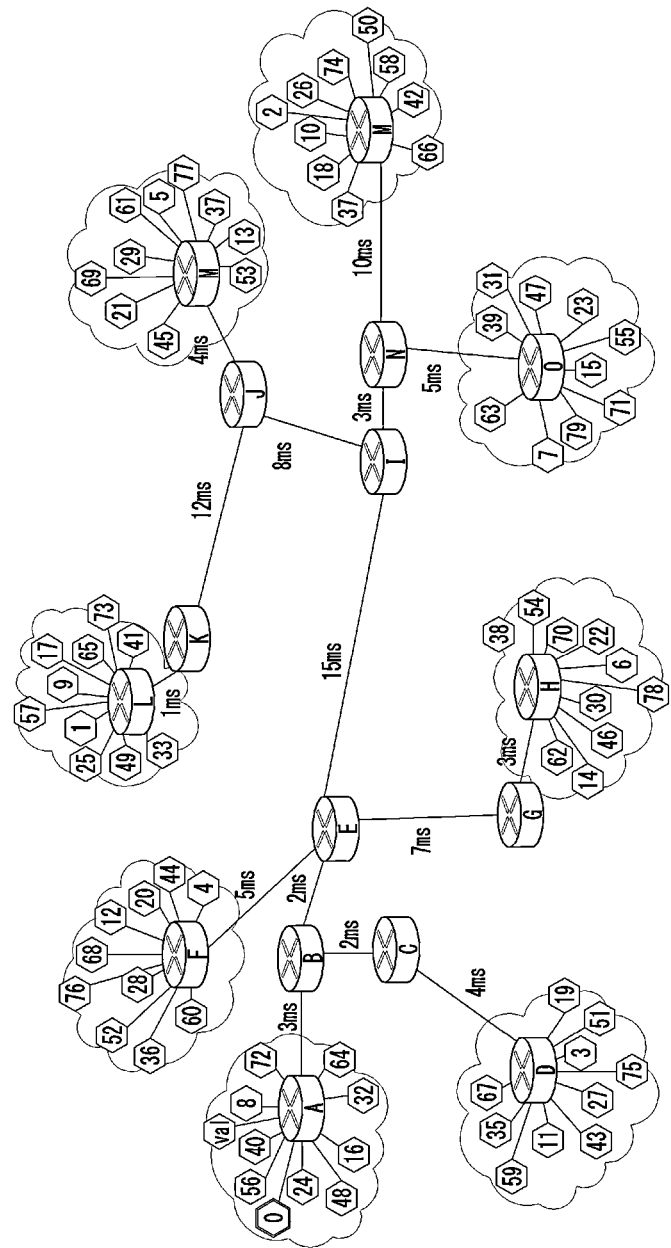
FIG. 1 is an example diagram of a peer-to-peer (P2P) network topology in which an end-to-end (E2E) delay estimation method according to an example embodiment of the present disclosure may be employed.

While the present invention is susceptible to various modifications and can have various embodiments, specific embodiments will be shown by way of example in the accompanying drawings and described in detail. It should be understood, however, that there is no intent to limit the present invention to the specific embodiments, but on the contrary, the present invention is to cover all modifications, equivalents, and alternatives falling within the spirit and technical scope of the present invention.

Although the terms "first," "second," and the like may be used to describe various components, these components should not be limited by these terms. These terms are only used to distinguish one component from another. For example, a first component may be termed a second component, and, similarly, a second component maybe termed a first component, without departing from the scope of the present invention. The term "and/or" includes any and all combinations of a plurality of associated listed items.

In embodiments of the present disclosure, "at least one of A and B" may mean "only A," "only B," "or "both A and B." Also, in embodiments of the present disclosure, "one or more of A and B" may mean "only A," "only B," "or "both A and B."

It will be understood that when a first component is referred to as being "connected" or "coupled" to a second component, the first component can be directly connected or coupled to the second component or an intervening component may be present. In contrast, when a component is referred to as being "directly connected" or "directly coupled" to another component, there is no intervening component present.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises," "comprising," "includes," and/or "including" used herein specify the presence of stated features, integers, steps, operations, components, parts, or a combination thereof, but do not preclude the presence or addition of one or more other features, integers, steps, operations, components, parts, or a combination thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings. In describing the present invention, to facilitate overall understanding, like reference numerals in the drawings refer to like components, and a duplicate description of the same component will be omitted.

FIG. 1 is an example diagram of a peer-to-peer (P2P) network topology in which an end-to-end (E2E) delay estimation method according to an example embodiment of the present disclosure may be employed.

As illustrated in FIG. 1, a P2P network topology may be configured in consideration of actual network delay values from Korea to the western US and the eastern US. In the P2P network topology, network delay values may be set on the basis of delay values actually measured through the Internet. For example, a delay value is shown as a number in each communication node. In the P2P network topology, three maximum E2E delays between two nodes in all of the regions are about 46 ms, about 37 ms, and about 36 ms. For simplicity, these delay values may be measured on the assumption that there is one origin node and one validation node and 80 nodes are almost evenly distributed to edge routers. In consideration of the P2P networks varying over time, a threshold value for coordinate maintenance may be set to 10 ms.

Performance of a blockchain node may be determined by estimating an E2E delay between blockchain nodes in the P2P networks in a realistic router-level network connected to an edge router or a realistic router-level network emulation environment which may correspond to the realistic router-level network. As a validation node, a blockchain node may be any one of communication nodes including edges and routers in the P2P networks.

To emulate a network environment realistically, a Mininet, a Containernet, or the like may be used. The E2E delay estimation system of the present embodiment may be implemented as a container in a blockchain node and easily integrated with other containers of an existing blockchain platform.

In the present embodiment, all blockchain nodes in the P2P networks may be participating nodes having a distributed ledger. Also, one of participating nodes which are in charge of constructing and managing a coordinate system may voluntarily be designated as the validation node among the blockchain nodes. The validation node may be changed any time by mutual consensus according to a node state and a network state.

Figure 2:
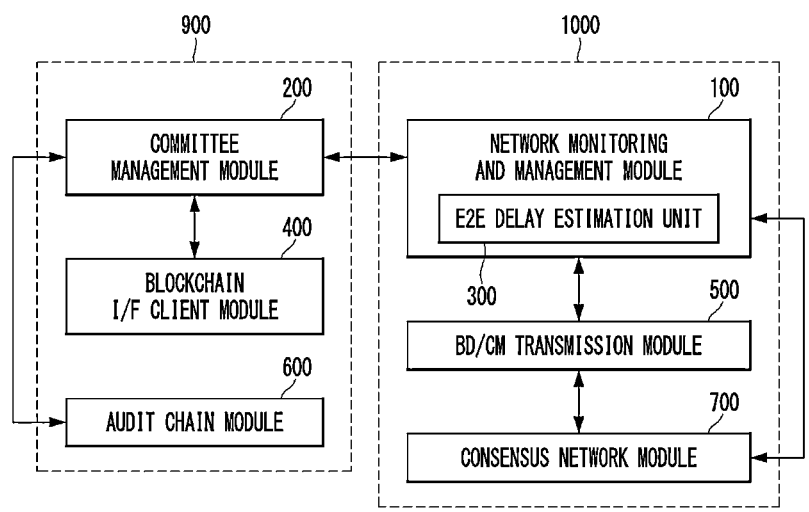
FIG. 2 is a block diagram of a blockchain platform architecture in which an E2E delay estimation system according to an example embodiment of the present disclosure may be employed.

FIG. 2 is a block diagram of a blockchain platform architecture in which an E2E delay estimation system according to an example embodiment of the present disclosure may be employed.

Referring to FIG. 2, a blockchain platform for an E2E delay estimation system includes a blockchain module 900 which is in charge of consensus and a network module 1000 which processes block data and consensus message transmission. The blockchain module 900 and the network module 1000 may cooperate closely with each other to improve blockchain quality of service (QoS).

The blockchain module 900 may include a committee management module 200, a blockchain interface (I/F) client module 400, and an audit chain module 600. The network module 1000 may include a network monitoring and management module 100, a blockchain data (BD)/consensus message (CM) transmission module 500 which transmits BD and/or a CM, and a consensus network module 700.

The E2E delay estimation system of the present embodiment may include an E2E delay estimation unit 300 which is included in the network monitoring and management module 100 of the network module 1000. The E2E delay estimation unit 300 has O(N) control message overhead. In this way, the E2E delay estimation unit 300 shows superior performance compared to existing delay estimation techniques having $O(N^2)$ control message overhead.

For convenience of description, the E2E delay estimation unit 300 will be referred to as an "E2E delay estimation system" below.

Figure 3:
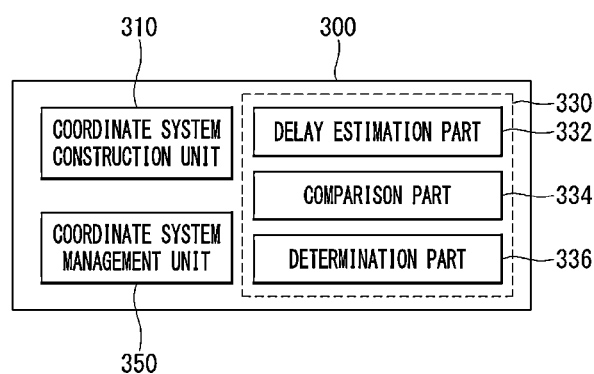
FIG. 3 is a schematic block diagram of an E2E delay estimation system that may be applied to the blockchain platform architecture of FIG. 2.

FIG. 3 is a schematic block diagram of an E2E delay estimation system that may be applied to the blockchain platform architecture of FIG. 2.

Referring to FIG. 3, the E2E delay estimation system 300 includes a coordinate system construction unit 310, a dimension determination unit 330, and a coordinate system management unit 350. The E2E delay estimation system 300 may be installed on a validation node that is voluntarily designated from among participating nodes in charge of constructing and managing a coordinate system.

The coordinate system construction unit 310 may perform an E2E delay-based coordinate system constructing process. In other words, the coordinate system construction unit 310 may perform a scalable E2E delay estimation process in a high-dimensional vector space.

To this end, the coordinate system construction unit 310 may designate an origin node and anchor nodes from among participating nodes having a distributed ledger of P2P networks and construct a coordinate system through control message exchange with the origin node, the anchor node, and other participating nodes. In particular, the coordinate system construction unit 310 may construct a coordinate system for a predetermined dimension and construct a coordinate system for another predetermined dimension. In other words, the coordinate system construction unit 310 may construct a coordinate system for each of a plurality of preset dimensions in substantially the same way.

The dimension determination unit 330 includes a dimension-specific delay estimation part 332, a comparison part 334, and a determination part 336 as functional elements. Through a dimension determination process based on these functional elements, the dimension determination unit 330 may estimate dimension-specific delays in a multidimensional coordinate system, such as two dimensions, three dimensions, four dimensions, five dimensions, six dimensions, and the like, compare the estimated dimension-specific delay values, and determine any one of a dimension of which an overall delay estimation error value is the smallest, a dimension in which the minimum control message cost is required for constructing a coordinate system, and a dimension which is selected according to a preset dimension determination policy as a coordinate system of the P2P networks.

The coordinate system management unit 350 may perform a coordinate maintenance process. The coordinate system management unit 350 may manage coordinates of the origin node, the anchor nodes, and the other participating nodes in the time-variant P2P networks due to the coordinate maintenance process and update the coordinates as necessary.

According to the E2E delay estimation system of the present embodiment, E2E delays between multiple blockchain nodes with O(N) control message overhead can be estimated through P2P networks. In particular, it is possible to provide a scalable and accurate E2E delay estimation system with small control message overhead to handle a large number of blockchain nodes. Also, it is possible to accurately maintain a coordinate system despite a time-variant P2P network condition.

Further, according to the E2E delay estimation system of the present embodiment, E2E delay information estimated between blockchain nodes can be used not only for block transmission but also for establishing a consensus committee on a blockchain platform. Accordingly, the E2E delay estimation system can be effectively applied to permissionless blockchains as well as permissioned blockchains.

Meanwhile, to actually improve performance of a blockchain platform, it is necessary to estimate E2E delays between distributed blockchains with small control message overhead. To achieve this goal, an E2E delay-based coordinate system may be constructed in an n-dimensional ($n_{dim}$) vector space in which blockchain nodes are displayed as points and the Euclidean distance between two points represents the E2E delay between the corresponding nodes.

Figure 4:
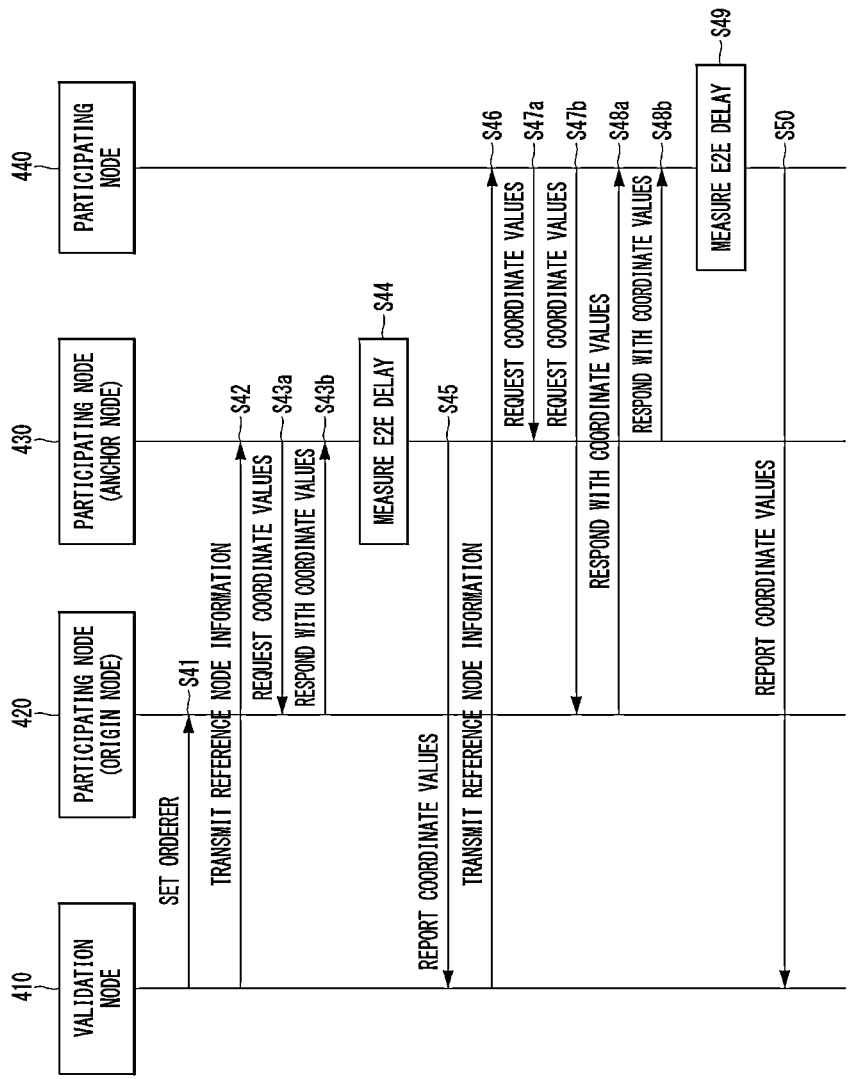
FIG. 4 is a sequence diagram illustrating a main operational principle of coordinate system constituent units of FIG. 3.

FIG. 4 is a sequence diagram illustrating a main operational principle of coordinate system constituent units of FIG. 3.

Referring to FIG. 4, first, an E2E delay estimation system which includes a coordinate system construction unit and corresponds to a validation node 410 may set one of participating nodes which are blockchain nodes as an origin node 420 of a coordinate system for a predetermined dimension (S41). The origin node 420 may be one of Ethereum validators or an orderer of a Hyperledger Fabric.

Subsequently, the validation node 410 may transmit referencing node information to a first anchor node 430 selected from among the participating nodes using a first control message (S42). The first anchor node 430 may request coordinate values from the origin node 420 on the basis of the referencing node information using a second control message and receive coordinate values from the origin node 420 (S43a and S43b). At the same time, the first anchor node 430 measures an E2E delay between the origin node 420 and the first anchor node 430 (S44). The first anchor node 430 may calculate coordinate values of the first anchor node 430 using the coordinate values of the origin node received from the origin node 420 and the measured E2E delay. Then, the first anchor node 430 may report coordinate values of anchor nodes including the first anchor node 430 and a second anchor node to the validation node 410 (S45).

Also, the first anchor node 430 may request coordinate values from the at least one second anchor node (not shown) on the basis of the referencing node information using a second control message and receive coordinate values as a response from the second anchor node.

Subsequently, the validation node 410 may transmit the referencing node information to the at least one second anchor node on the basis of the coordinate value report of the first anchor node 430 and receive a coordinate value report from the at least one second anchor node. Before transmitting a control message for reporting coordinate values to the validation node 410, the second anchor node may request coordinate values from the origin node 420 on the basis of the referencing node information of the validation node 410, receive a response of the coordinate values from the origin node 420, request coordinate values from another anchor node, receive a response of the coordinate values from the other anchor node, and measure an E2E delay between the origin node 420 and the second anchor node and an E2E delay between the other anchor node and the second anchor node.

In this way, the validation node 410 may acquire coordinate values of all anchor nodes. Also, the validation node 410 may acquire E2E delay values measured at the anchor nodes.

Subsequently, the validation node 410 may transmit a first control message to participating nodes 440 other than the origin node 420 and the anchor nodes (S46). The first control message may include the referencing node information. The participating nodes 440 receiving the first control message from the validation node 410 may request coordinate values from the anchor nodes including the first anchor node 430 and the origin node 420 through a second control message (S47a, S47b) and receive a response of coordinate values from each node through a second control message (S48a, S48b). Here, the participating nodes 440 may measure E2E delays between the origin node 420 and the participating nodes 440 and E2E delays between each anchor node and the participating nodes 440 (S49). Then, the participating nodes 440 may report the coordinate values and the measured E2E delay values to the validation node 410 (S50).

In this way, the validation node 410 may acquire coordinate values of all the participating nodes 440 other than the origin node 420 and the anchor nodes. Also, the validation node 410 may acquire E2E delay values measured at all the participating nodes.

According to the foregoing configuration, a coordinate system construction unit or an E2E delay estimation system including the coordinate system construction unit may construct a coordinate system for a specific dimension. Also, the coordinate system construction unit or the E2E delay estimation system including the coordinate system construction unit may construct a coordinate system for another predetermined dimension by repeating the above process for the other dimension in substantially the same way. For example, to set up coordinate axes beginning from an origin node, a three-dimensional (3D) coordinate system may include at least three anchor nodes, a four-dimensional (4D) coordinate system may include at least four anchor nodes, a five-dimensional (5D) coordinate system may include at least five anchor nodes, and a six-dimensional (6D) coordinate system may include at least six anchor nodes.

Figure 5:
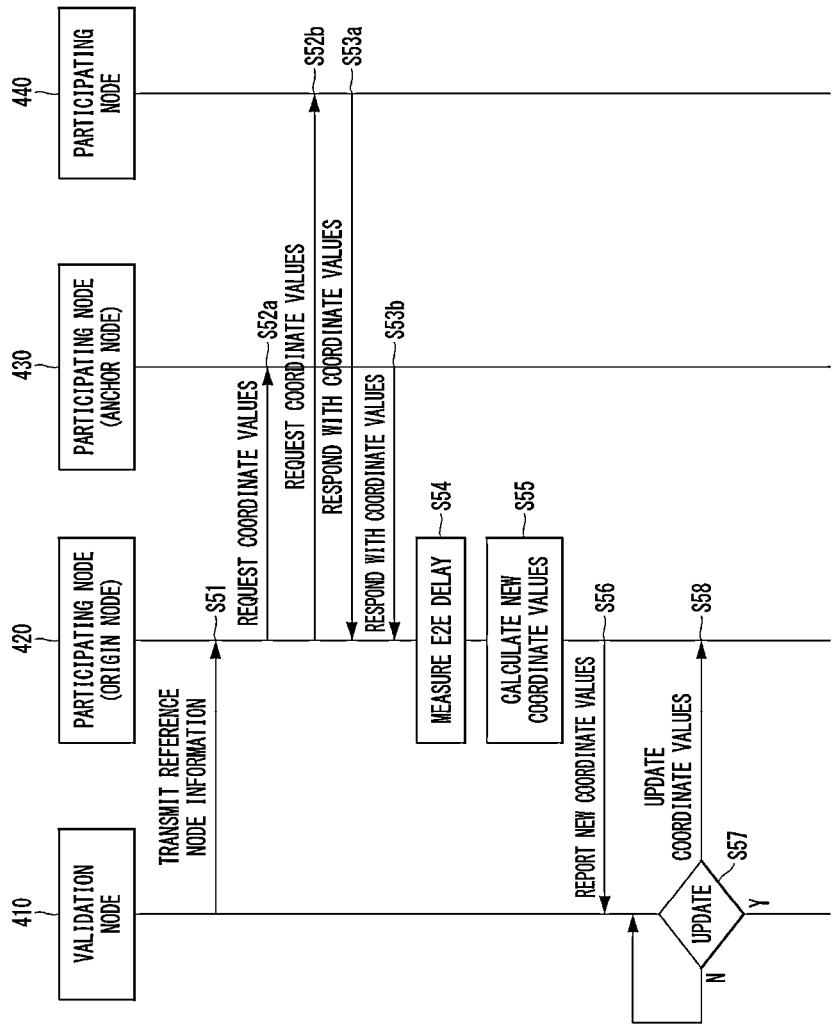
FIG. 5 is a sequence diagram illustrating a main operational principle of coordinate system constituent units of FIG. 3.

FIG. 5 is a sequence diagram illustrating a main operational principle of coordinate system constituent units of FIG. 3.

Referring to FIG. 5, an E2E delay estimation system which includes a coordinate system management unit and corresponds to the validation node 410 may transmit referencing node information to the origin node 420 which is an orderer of P2P networks (S51). Here, the origin node 420 operates as an origin node of a coordinate system for a specific dimension determined by a dimension determination unit from among dimensions of which E2E delays are separately estimated by a coordinate system construction unit. In other words, the origin node 420 may receive the referencing node information from the validation node 410 through a first control message (S51).

The origin node 420 may request coordinate values from anchor nodes including a first anchor node 430 and participating nodes 440 using a second control message (S52a, S52b) and receive a response of coordinate values from each anchor node and each participating node (S53a, S53b). Here, the origin node 420 may measure an E2E delay between each anchor node and the origin node 420 and an E2E delay between each participating node 440 and the origin node 420 by transmitting and receiving second control messages (S54).

After that, the origin node 420 may calculate new coordinate values on the basis of the measured E2E delay values and the coordinate values received from the anchor nodes and the participating nodes (S54). Then, the origin node 420 may generate relative position change information on the basis of the calculated new coordinate values and the existing coordinate values.

Subsequently, the origin node 420 may report the new coordinate values or the relative position change information to the validation node 410 (S56). In other words, the validation node 410 may receive the new coordinate values or the relative position change information from the origin node 420. The new coordinate values may be in accordance with a change of the P2P networks.

Subsequently, the validation node 410 may determine whether a coordinate update is necessary on the basis of the new coordinate values (557). When a coordinate update is necessary, the validation node 410 may transmit a first control message for a coordinate value update to the origin node 420 (558). In other words, the origin node 420 may receive the first control message for a coordinate value update from the validation node 410.

When the first control message for a coordinate value update is received, the origin node 420 may update its own coordinates and the coordinate system including the coordinates on the basis of coordinate value update information.

According to the foregoing configuration, the validation node 410 may construct an E2E delay-based coordinate system through the anchor nodes, construct a coordinate system for each dimension by transmitting and receiving control messages to and from all participating nodes, and estimate an E2E delay of each coordinate system. According to such a configuration, the validation node 410, that is, the E2E delay estimation system, may select and manage a coordinate system of a specific dimension showing optimal performance for the current P2P networks on the basis of E2E delay states each estimated for dimension-specific coordinate systems.

Also, a specific control message format may be designed and used to efficiently obtain coordinate values of each node in P2P networks.

Figure 6:
FIG. 6 is a diagram illustrating a first control message format for transmitting referencing node information which may be employed in an E2E delay estimation method of the present embodiment.

FIG. 6 is a diagram illustrating a first control message format for transmitting referencing node information which may be employed in an E2E delay estimation method of the present embodiment.

Referring to FIG. 6, a first control message 610 may contain information representing N dimensions Ndim, information representing a node index NodeIdx, information representing an event type EventType, and information representing the number of referencing nodes NumRef. Here, N may be a natural number from 2 to 10.

The event type EventType may be used for determining whether the first control message 610 is a control message for constructing a coordinate system or a control message for managing a coordinate system. For example, an event type of 0 represents a control message for constructing a coordinate system, and an event type of 1 represents a control message for managing a coordinate system. In addition to the form of 0 or 1, event types may have various forms including at least two different values, numbers, letters, symbols, or a combination thereof.

Also, the first control message 610 may contain referencing node information including a first referencing node Internet protocol (IP) Ref Node IP #1, a second referencing node IP Ref Node IP #2, and the like. The first control message 610 is transmitted from a validation node to participating nodes. The participating nodes may include an origin node and an anchor node.

Figure 7:
FIG. 7 is a diagram illustrating a second control message format for transmitting and receiving coordinate values which may be employed in an E2E delay estimation method of the present embodiment.

FIG. 7 is a diagram illustrating a second control message format for transmitting and receiving coordinate values which may be employed in an E2E delay estimation method of the present embodiment.

Referring to FIG. 7, a second control message 710 may contain information representing a message type MsgType and information representing corresponding dimensions Ndim. The message type MsgType may be used for indicating whether the corresponding control message is a request message or a response message. When the corresponding control message is a request message, the message type may be displayed as "A," and when the corresponding control message is a response message, the message type may be displayed as "B." However, message types are not limited thereto. Message types may have various forms including at least two different values, numbers, letters, symbols, or a combination thereof.

Also, the second control message 710 may contain coordinate values shown as a first coordinate value coordinate value x_1, a second coordinate value coordinate value x_2, an $N^{th}$ coordinate value coordinate value $x\_N_{dim}$, and the like.

The second control message 710 is transmitted and received between participating nodes. The participating nodes may include an origin node and an anchor node.

According to the foregoing control message formats of FIGS. 6 and 7, each participating node may measure an E2E delay value while exchanging second control messages with another referencing node, that is, a participating node of which coordinate values have already been identified, to obtain coordinate values.

After an E2E delay-based coordinate system is constructed, a validation node may execute a coordinate maintenance process periodically or on demand when at least one participating node requests a coordinate maintenance process, to detect a change of a network state and manage the coordinate system.

As described above, two random nodes may be logically connected to each other through P2P networks. Accordingly, $O(N_{peer}^2)$ control message overhead may theoretically occur to measure all E2E delay values between a plurality of ($N_{peer}$) participating nodes. The overhead may be a heavy load on the P2P networks when the number of participating nodes increases. Therefore, the E2E delay estimation system of the present embodiment provides an efficient E2E delay estimation process with $O(N_{peer})$ message overhead.

FIGS. 8 to 11 are example diagrams illustrating a multi-dimensional coordinate system construction procedure that may be employed in an E2E delay estimation method of the present embodiment.

Referring to FIGS. 8 to 11, as a preselected validation node, an E2E delay estimation system may construct a coordinate system among an origin node and randomly selected anchor nodes through control message exchange for a specific dimension $n_{dim}$ selected from a range from a minimum dimension $D_{min}$ to a maximum dimension $D_{max}$.

Here, the specific dimension $n_{dim}$ may be a natural number from 1 to 10, and the number of anchor nodes selected by the validation node may be $n_{dim}$.

In the following description, $(x_1^i, x_2^i, \ldots, x_{N_{dim}}^i)$ are coordinate values of node i in an $N_{dim}$-dimensional vector space, and $t^{i,j}$ is an E2E delay measured between node i and node j. Here, the origin node may be represented as Node #0. Anchor nodes may be positioned as far as possible from the origin node to reduce a time-variant E2E delay so that the accuracy of the coordinate system can be increased.

Figure 8:
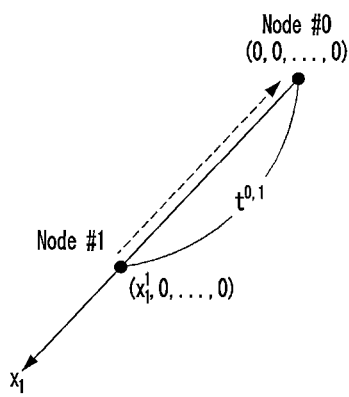
FIGS. 8 to 11 are example diagrams illustrating a multidimensional coordinate system construction procedure that may be employed in an E2E delay estimation method of the present embodiment.

Specifically, as shown in FIG. 8, the E2E delay estimation system (hereinafter "delay estimation system") may set one of Ethereum validators or an orderer of a Hyperledger Fabric as the origin node Node #0 which is the origin of the coordinate system. Coordinates of the origin may be set to (0, 0, . . . , 0). In other words, coordinates of an origin node $(x_1^0, x_2^0, \ldots, x_{N_{dim}}^0)$ in N dimensions may be set to (0, 0, . . . , 0).

Subsequently, the delay estimation system may select one of participating nodes as a first node Node #1 and define a straight line between the orderer and the first node Node #1 as a first axis $x_1$. Also, a delay between the orderer and the first node Node #1 may be measured through the orderer. After that, an $x_1$ coordinate of the first node Node #1 may be defined as the previously measured delay or a value corresponding to the delay.

When the $x_1$ coordinates of the first node Node #1 are $(x_1^1, 0, \ldots, 0)$, the first node Node #1 may be set to $(t_1^{0,1},$ $0, \ldots, 0$) as a first anchor node. $t^{0,1}$ is a delay time t between the origin node Node #0 and the first anchor node Node #1.

Figure 9:
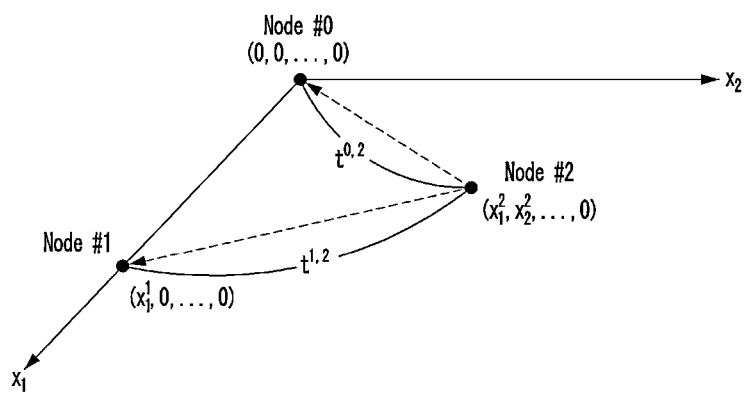

Subsequently, as shown in FIG. 9, the delay estimation system selects one of the participating nodes as a second node Node #2. In other words, the delay estimation system selects the second node Node #2 which is not on the straight line connecting the origin node Node #0 and the first node Node #1 as a second anchor node. After that, the delay estimation system constructs an x1-x2 plane using the origin node, the first anchor node, and the second anchor node.

After that, the delay estimation system may acquire a delay value between the second node Node #2 and the orderer and a delay value between the first node Node #1 and the second node Node #2 and calculate a delay between the origin node and the second node Node #2 and a delay between the first anchor node and the second node Node #2 on the basis of the acquired E2E delay values and the coordinate values received from the origin node and the first anchor node according to Equations 1 and 2.

$$\sqrt{(x_1^2)^2 + (x_2^2)^2} = t^{0,2} \quad \text{[Equation 1]}$$

$$\sqrt{(x_1^2 - x_1^1)^2 + (x_2^2)^2} = t^{1,2} \quad \text{[Equation 2]}$$

Here, the second node Node #2 is the second anchor node, and coordinate values thereof may be represented as $(x_1^2, x_2^2, 0, \ldots, 0)$.

Therefore, among candidate coordinate values of the second node Node #2 which is the second anchor node, an $x_1^2$ coordinate value and an $x_2^2$ coordinate value are represented as shown in Equations 3 and 4, respectively.

$$x_1^2 = \frac{(x_1^1)^2 + (t^{0,2})^2 - (t^{1,2})^2}{2x_1^1} \quad \text{[Equation 3]}$$

$$x_2^2 = \pm \sqrt{(t^{0,2})^2 - \left(\frac{(x_1^1)^2 + (t^{0,2})^2 - (t^{1,2})^2}{2x_1^1}\right)^2} \quad \text{[Equation 4]}$$

Actually, the two coordinate values $x_1^2$ and $x_2^2$ satisfy Equations 1 and 2.

Figure 10:
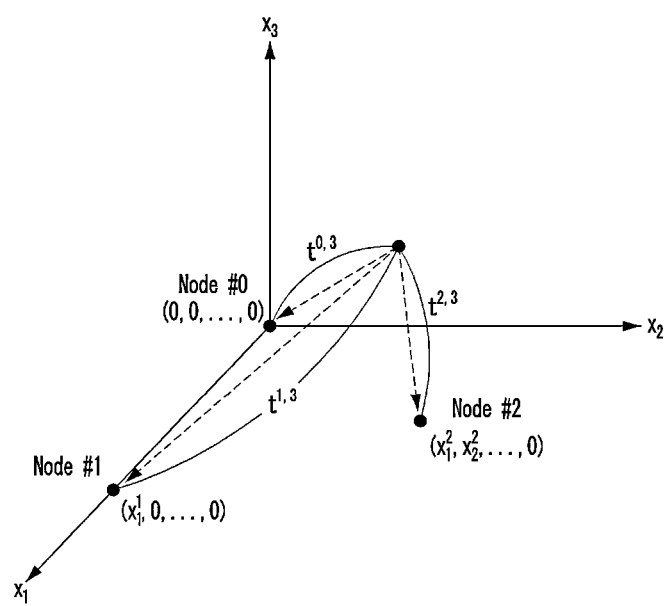

Subsequently, as shown in FIG. 10, the delay estimation system may select a third anchor node Node #3 which is not disposed in the $x_1$-$x_2$ plane constructed above. In other words, the delay estimation system may construct an $x_1$-$x_2$-$x_3$ space having the origin node Node #0 as the origin using the origin node Node #0, the first anchor node Node #1, the second anchor node Node #2, and the third anchor node Node #3.

Subsequently, the delay estimation system may acquire E2E delays between the third anchor node Node #3 and the origin node, the first anchor node, and the second anchor node and also acquire candidate coordinate values of the third anchor node calculated at the third anchor node. It is obvious that the delay estimation system which is a validation node may calculate candidate coordinate values of the third anchor node on the basis of the E2E delay values received from the third anchor node.

When coordinate values of the third anchor node are $(x_1^3, x_2^3, x_3^3, 0, \ldots, 0)$, candidate coordinate values $x_1^3, x_2^3, x_3^3$ of the third anchor node may be represented as shown in Equations 5, 6, and 7 below.

$$x_1^3 = \frac{(x_1^1)^2 + (t^{0,3})^2 - (t^{1,3})^2}{2x_1^1} \quad \text{[Equation 5]}$$

$$x_2^3 = \frac{(x_1^1)^2 - 2x_1^1 x_1^3 - (x_2^2)^2 + (t^{0,3})^2 - (t^{2,3})^2}{2x_2^2} \quad \text{[Equation 6]}$$

$$x_3^3 = \pm \sqrt{(t^{0,3})^2 - (x_1^3)^2 - (x_2^3)^2} \quad \text{[Equation 7]}$$

Then, an equation for remaining anchor nodes, that is, from a fourth anchor node to an $N_{dim}^{th}$ anchor node, may be generalized.

Among a plurality of anchor nodes predetermined according to a preset dimension, a randomly selected $i^{th}$ anchor node ($1 \leq i \leq N_{dim}$) measures an E2E delay value between the origin node and the ith anchor node and an E2E delay value between a previous anchor node and the $i^{th}$ anchor node. After the E2E delay values are measured and coordinates of previous anchor nodes are received, candidate coordinate values of the $i^{th}$ anchor node may be determined according to the generalized equation.

Figure 11:
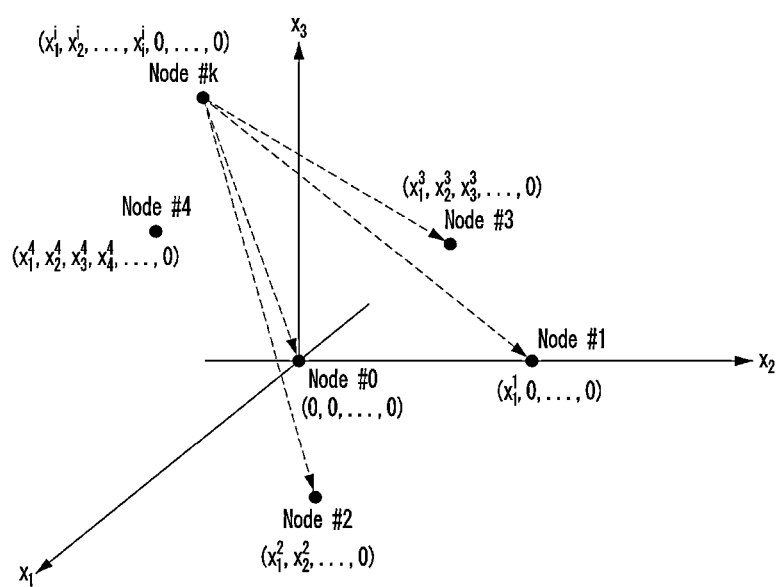

As shown in FIG. 11, when coordinates of the $i^{th}$ anchor node are $(x_1^i, x_2^i, \ldots, x_i^i, 0, \ldots, 0)$, candidate coordinate values of the $i^{th}$ anchor node may be generalized as shown in Equations 8 and 9.

$$x_k^i = \frac{\sum_{l=0}^{k-1}\{(x_l^k)^2 - 2x_l^k x_l^i\} + (x_k^k)^2 + (t^{0,i})^2 - (t^{k,i})^2}{2x_k^k} \quad \text{[Equation 8]}$$

for $1 \leq k \leq i$ $$x_i^i = \pm \sqrt{(t^{0,i})^2 - \sum_{l=1}^{i-1}(x_l^i)^2} \quad \text{[Equation 9]}$$

The delay estimation system may repeat the same procedure on the basis of Equations 8 and 9 above until candidate coordinate values of the $(n_{dim})^{th}$ anchor node are found. Meanwhile, there are limitations in illustrating a coordinate system constructing process from the fourth anchor node, and thus the pseudo code described in the present applicant's paper may be referred to.

An $(n_{dim}+1)^{th}$ node may be randomly selected to measure E2E delays between the selected node and the origin node and all anchor nodes. When the $(n_{dim}+1)^{th}$ node is used, coordinates of previous anchor nodes are finally determined, and the presence of coordinate values of a current node can be ensured as shown in Equation 10.

$$\sqrt{\sum_{d=1}^{k}\left(x_1^{n_{dim}+1} \pm x_d^k\right)^2 - \sum_{d=k+1}^{n_{dim}}\left(x_d^{n_{dim}+1}\right)^2} = \quad \text{[Equation 10]}$$

$t^{k,n_{dim}+1}$ for $0 \leq k \leq n_{dim}$

Here, $(x_1^{n_{dim}+1}, x_2^{n_{dim}+1}, \ldots x_{n_{dim}}^{n_{dim}+1})$ may be coordinate values of the $(n_{dim}+1)^{th}$ participating node.

When a coordinate system of the specific dimension is constructed, a new participating node may transmit a request message to the origin node and several anchor nodes or several referencing nodes and then measure E2E delay values until corresponding response messages including coordinate values are received, thereby finding coordinate values thereof. The coordinate values of the new participating node may be obtained through the same process as described above.

In a distributed network environment, it may sometimes be challenging to obtain the sufficient information on nodes to identify coordinate values of the nodes. That is, in the foregoing coordinate system constructing process, an additional delay may occur because a referencing node is changed or it is difficult to determine coordinates, for example, in a case where the inverse matrix does not exist in the matrix form. In the delay estimation system of the present embodiment, to solve this problem without additional delay, a new participating node may be brought in contact with a sufficient number of randomly selected nodes including anchor nodes and obtain coordinate values of the selected nodes.

In the above case, for example, when the origin node Node #0 and only three referencing nodes are used, there may be no inverse matrix of Equation 6. To prepare against such a case, the delay estimation system may measure transmission delays and request coordinate values by exchanging control messages with four or more nodes in an overdetermined system operating mode and obtain an approximated solution.

A process of obtaining an approximated solution is represented as Equation 11 below.

$$A\vec{\omega} = \vec{b}, \quad \text{[Equation 11]}$$

$$\text{where } A = \begin{bmatrix} x_1^1 & x_2^1 & \cdots & x_{n_{dim}}^1 \\ x_1^2 & x_2^2 & \cdots & x_{n_{dim}}^2 \\ \vdots & \vdots & \ddots & \vdots \\ x_1^{N_{ref}} & x_2^{N_{ref}} & \cdots & x_{n_{dim}}^{N_{ref}} \end{bmatrix}, \vec{\omega} = \begin{bmatrix} x_1^k \\ x_2^k \\ \vdots \\ x_{n_{dim}}^k \end{bmatrix} \text{ and}$$

$$\vec{b} = \begin{bmatrix} \left((t^{0,k})^2 + \sum_{d=1}^{n_{dim}} (x_d^1)^2 - (t^{1,k})^2\right)/2 \\ \left((t^{0,k})^2 + \sum_{d=1}^{n_{dim}} (x_d^2)^2 - (t^{2,k})^2\right)/2 \\ \vdots \\ \left((t^{0,k})^2 + \sum_{d=1}^{n_{dim}} (x_d^{N_{ref}})^2 - (t^{N_{ref},k})^2\right)/2 \end{bmatrix}.$$

In Equation 11, $N_{ref}$ is the number of referencing nodes.

According to Equation 11, an approximated solution $\vec{\omega}_{app}$ may be obtained to minimize an error represented as $\|\vec{\omega}_{app} - \vec{b}\|$ as shown in Equation 12.

$$\vec{\omega}_{app} = (A^T A)^{-1} A^T \vec{b} \quad \text{[Equation 12]}$$

Meanwhile, the delay estimation system may perform a coordinate maintenance process for the accuracy of coordinates in the time-variant P2P networks, thereby stably maintaining the coordinate system. In other words, coordinate values of the participating nodes are changed due to the time-variant P2P network condition. Therefore, the delay estimation system may perform a coordinate maintenance process to efficiently maintain the accuracy of the coordinate system despite a change in the network condition.

In other words, the origin node Node #0 may periodically calculate its own coordinates using coordinate values of other nodes and newly measured delays. Here, when the calculated coordinate values of the origin node Node #0 significantly deviate from the origin by a reference value or more, a new coordinate system may be constructed.

To this end, in the coordinate maintenance process, the origin node Node #0 may select $n_{dim}$ or more random nodes Node #1, . . . , and Node #$N^{ref}$, measure transmission delays between the origin node Node #0 and the selected nodes, and calculate coordinate values of the origin node Node #0 by calculating an inverse matrix of Equation 13.

In this way, in a coordinate maintenance process, the origin node may transmit a request message to $N^{ref}$ referencing nodes in the delay estimation system. The origin node may perform the same process as a new participating node obtaining its own coordinates after a current coordinate system is constructed, and may calculate its own approximated coordinate values on the basis of response messages resulting from the process as shown in Equation 13.

$$\begin{bmatrix} x_1^1 & x_2^1 & \cdots & x_{n_{dim}}^1 \\ x_1^2 & x_2^2 & \cdots & x_{n_{dim}}^2 \\ \vdots & \vdots & \ddots & \vdots \\ x_1^{N_{ref}} & x_2^{N_{ref}} & \cdots & x_{n_{dim}}^{N_{ref}} \end{bmatrix} \begin{bmatrix} x_1^0 \\ x_2^0 \\ \vdots \\ x_{n_{dim}}^0 \end{bmatrix} = \quad \text{[Equation 13]}$$

$$\begin{bmatrix} \left(\sum_{d=1}^{n_{dim}} (x_d^0)^2 - (t^{0,1})^2\right)/2 \\ \left(\sum_{d=1}^{n_{dim}} (x_d^0)^2 - (t^{0,2})^2\right)/2 \\ \vdots \\ \left(\sum_{d=1}^{n_{dim}} (x_d^0)^2 - (t^{0,N_{ref}})^2\right)/2 \end{bmatrix}$$

Figure 12:
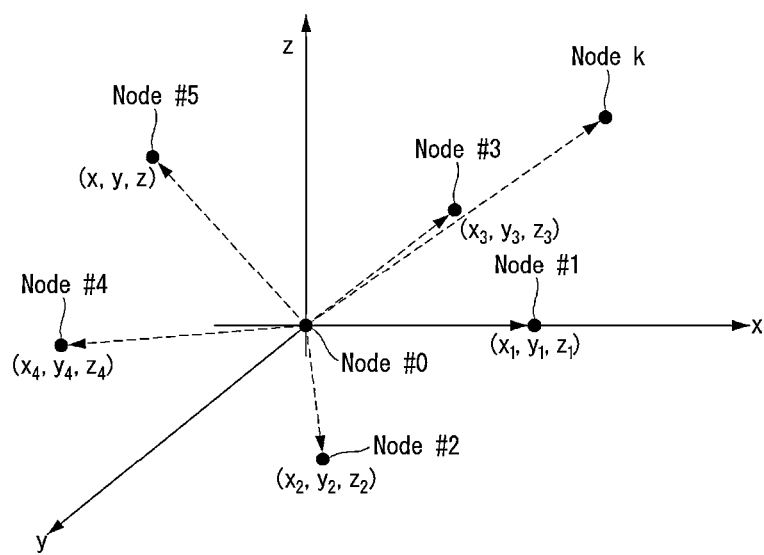
FIG. 12 is an example diagram illustrating a three-dimensional (3D) coordinate management process that may be employed in an E2E delay estimation method of the present embodiment.

A coordinate maintenance process which is applicable to a 3D coordinate system is illustrated in FIG. 12.

FIG. 12 is an example diagram illustrating a 3D coordinate management process that may be employed in an E2E delay estimation method of the present embodiment.

Referring to FIG. 12, in a coordinate maintenance process of a delay estimation system, an origin node Node #0 may select a plurality of nodes, for example, at least a first node Node #1, a second node Node #2, a third node Node #3, and a $k^{th}$ node Node #k, from among random anchor nodes or participating nodes.

After that, the origin node Node #0 may measure transmission delays $d_{0,1}, d_{0,2}, \ldots, d_{0,k}$ between the origin node Node #0 and the selected nodes by exchanging control messages with the selected nodes.

Subsequently, the origin node Node #0 may calculate its coordinate values $x_0$, $y_0$, $z_0$ by calculating an inverse matrix as shown in Equation 14.

$$\begin{bmatrix} x_1 & y_1 & z_1 \\ x_2 & y_2 & z_2 \\ x_3 & y_3 & z_3 \\ \cdots & \cdots & \cdots \\ x_k & y_k & z_k \end{bmatrix} \begin{bmatrix} x_0 \\ y_0 \\ z_0 \end{bmatrix} = \begin{bmatrix} (x_1^2 + y_1^2 + z_1^2 - d_{0,1}^2)/2 \\ (x_2^2 + y_2^2 + z_2^2 - d_{0,2}^2)/2 \\ (x_3^2 + y_3^2 + z_3^2 - d_{0,3}^2)/2 \\ \cdots \\ (x_k^2 + y_k^2 + z_k^2 - d_{0,k}^2)/2 \end{bmatrix} \quad \text{[Equation 14]}$$

When the calculated coordinate values of the origin node Node #0 deviate from the origin (0, 0, 0) which is existing coordinate values of the origin node Node #0 by a certain reference value or more, the delay estimation system may operate to reconstruct a coordinate system.

Meanwhile, it has been illustrated in the foregoing embodiment that the origin node Node #0 which is an orderer is positioned at reference coordinates (0, 0, 0), but the present embodiment is described on the assumption that the origin node is moved to random coordinates ($x_0, y_0, z_0$).

In this way, according to the present embodiment, even when E2E delays between nodes are changed according to a time-variant P2P network state, it is possible to monitor changes in the state of a network, effectively manage a coordinate system on the basis of a specific base node, and update the coordinate system as necessary.

As described above, non-zero coordinates of an origin node represent that network states between blockchain nodes have been changed in P2P networks. Accordingly, it is necessary to immediately update the coordinate system. To reduce the overhead of a coordinate system update, a delay estimation system may be set to update the coordinate system only when the difference between the origin node and newly calculated coordinates of the origin is larger than a threshold value. The threshold value may be in accordance with the degree of change in a network environment over time. Therefore, in E2E delay estimation between blockchain nodes in the P2P networks, control message complexity is $O(N_{peer})$.

Figure 13:
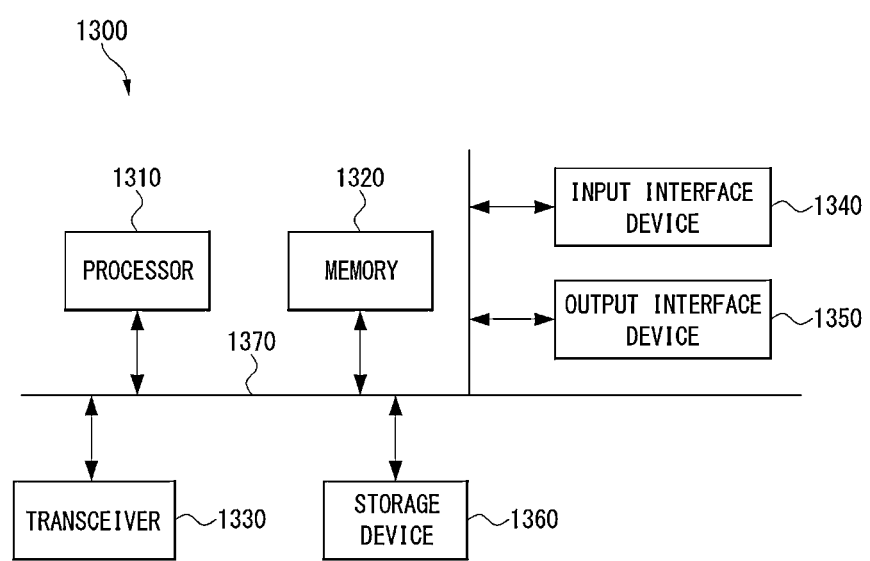
FIG. 13 is a schematic block diagram of an E2E delay estimation system according to another example embodiment of the present disclosure.

FIG. 13 is a schematic block diagram of an E2E delay estimation system according to another example embodiment of the present disclosure.

Referring to FIG. 13, a delay estimation system 1300 may include at least one processor 1310. The delay estimation system 1300 may further include a memory 1320 or a transceiver 1330 that is connected to a network to perform communication. Also, the delay estimation system 1300 may further include at least one of an input interface device 1340, an output interface device 1350, and a storage device 1360. The components included in the delay estimation system 1300 may be connected through a bus 1370 and communicate with each other.

The processor 1310 may be a central processing unit (CPU), a graphics processing unit (GPU), or a dedicated processor for performing methods according to example embodiments of the present invention.

Each of the memory 1320 and the storage device 1360 may be at least one of a volatile storage medium and a non-volatile storage medium. For example, the memory 1320 may be at least one of a read-only memory (ROM) and a random-access memory (RAM).

Also, the processor 1310 may execute program commands stored in at least one of the memory 1320 and the storage device 1360. The program commands may include at least one command for a coordinate system constructing process, at least one command for a dimension determination process, at least one command for a coordinate management process, and the like.

The transceiver 1330 may include a communication interface or a sub-communication system for connection to a local wireless network or a cable, communication with a satellite, wired or wireless communication with a general-purpose base station, an ideal backhaul link to a mobile edge core network or a core network, connection to a non-ideal backhaul link, or the like.

The input interface device 1340 may include at least one selected from among input devices including a keyboard, a microphone, a touchpad, a touch screen, and the like, and an input signal processing part which maps a signal input through the at least one input device to a prestored command or processes the signal.

The output interface device 1350 may include an output signal processing part which maps a signal output according to control of the processor 1310 to a prestored signal form or level and at least one output device which outputs a signal or information in the form of vibrations, light, or the like according to a signal of the output signal processing part. The at least one output device may be at least one selected from among output devices including a speaker, a display device, a printer, an optical output device, a vibration output device, and the like.

According to the present disclosure, the Euclidean distance between two blockchain nodes in P2P networks is defined as representing a corresponding E2E delay. Accordingly, it is possible to arrange all blockchain nodes in a high dimensional (four or more dimensions) vector space on the basis of E2E delay values and rapidly calculate a transmission delay of an actual network through a multidimensional coordinate system. Consequently, it is possible to notably reduce control message overhead for handling a large number of blockchain nodes and provide a highly scalable and accurate E2E delay estimation method.

Also, according to the present disclosure, it is possible to provide an E2E delay estimation system involving a coordinate maintenance process so that a coordinate system for supporting coordinate values allocated to each blockchain node can be accurately maintained despite a time-variant P2P network condition, that is, in a P2P network environment varying over time. According to this new E2E delay estimation system, a coordinate maintenance process can be introduced to effectively maintain a coordinate system, and thus it is possible to effectively find and maintain a transmission delay between nodes required for building blockchain P2P networks.

Further, according to the present disclosure, it is possible to provide E2E delay information estimated between blockchain nodes for not only block transmission but also consensus committee establishment on a blockchain platform. The E2E delay estimation information is used in permissionless blockchains as well as permissioned blockchains to increase stability and reliability of a blockchain system. In addition, an E2E delay estimation system can be simply implemented using a well-known open source, and it is possible to effectively verify performance of the implemented system.

Methods according to the present invention may be implemented in the form of program commands which are executable by various computing devices, and recorded on a computer-readable medium. The computer-readable medium may include program commands, data files, data structures, and the like solely or in combination. The program commands recorded on the computer-readable medium may be specially designed for the present invention or may be well known and available to those of ordinary skill in the computer software field.

Examples of the computer-readable medium include hardware devices specially configured to store and execute program commands such as a ROM, a RAM, a flash memory, and the like. Examples of the program commands include not only machine language code generated by a compiler but also high-level language code executable by a computer using an interpreter or the like. The hardware devices may be configured to operate as at least one software module to perform operations of the present invention and vice versa.

Although some aspects of the present invention have been described in the context of a device or apparatus, these aspects also represent a description of a corresponding method, in which blocks or devices correspond to method steps or features of method steps. Similarly, aspects described in the context of a method may also be represented as corresponding blocks or items or features of a corresponding device. All or some method steps may be performed by (or using) a hardware device such as a microprocessor, a programmable computer, or an electronic circuit. In some embodiments, at least one of the most important method steps may be performed by such a device.

In embodiments, a programmable logic device, such as a field-programmable gate array, may be used to perform some or all functions of the methods described herein. In embodiments, the field-programmable gate array may operate with a microprocessor to perform one of the methods described herein. In general, the methods are preferably performed by a certain hardware device.

Although the present invention has been described above with reference to embodiments, those of ordinary skill in the art should understand that various modifications and changes can be made without departing from the spirit and scope of the present invention described in the following claims.

What is claimed is:

1. A system for estimating an end-to-end (E2E) delay between blockchain nodes in peer-to-peer (P2P) networks, the system comprising:
a processor connected to a memory;
a coordinate system construction unit configured to designate an origin node and anchor nodes among participating nodes having a distributed ledger of P2P networks, construct a first coordinate system of a predetermined dimension by exchanging control messages between the origin node and the anchor nodes and the participating nodes, and construct a second coordinate system of another predetermined dimension; and
a dimension determination unit configured to determine a desired dimension by comparing dimension-specific delays of the first coordinate system and the second coordinate system.

2. The system of claim 1, wherein control message exchange between the origin node and a validation node including the coordinate system construction unit and the dimension determination unit is performed using a first control message,
control message exchange between the validation node and the anchor nodes is performed using the first control message, and
control message exchange between the anchor nodes and the participating nodes is performed using a second control message.

3. The system of claim 2, wherein the first control message includes information representing a dimension, information representing a node index, information representing an event type, and information representing the number of referencing nodes.

4. The system of claim 3, wherein the event type is used for distinguishing between a control message for coordinate system construction and a control message for coordinate system management.

5. The system of claim 2, wherein the second control message includes information representing a message type and information representing a dimension.

6. The system of claim 1, further comprising a coordinate system management unit configured to request coordinate values thereof in the current P2P networks from the origin node after the coordinate systems are constructed, and update coordinate values of the origin node when new coordinate values received from the origin node have a difference of a reference value or more from previous coordinate values.

7. A method of estimating an end-to-end (E2E) delay between blockchain nodes in peer-to-peer (P2P) networks, the method comprising:
setting, by a validation node, a first participating node among a plurality of participating nodes which are blockchain nodes as an orderer node or an origin node;
transmitting first referencing node information to a plurality of anchor nodes selected from among the plurality of participating nodes;
receiving coordinate values and E2E delay measurement values from the plurality of anchor nodes;
transmitting second referencing node information to third participating nodes not belonging to the origin node or the plurality of anchor nodes among the plurality of participating nodes;
receiving coordinate values and E2E delay measurement values from the third participating nodes;
calculating a first control message overhead for a preset first dimensional coordinate system constructed on the basis of the coordinate values and the E2E delay measurement values received from the plurality of anchor nodes and the third participating nodes; and
calculating a second control message overhead for a second dimensional coordinate system different from the first dimensional coordinate system constructed on the basis of the coordinate values and the E2E delay measurement values received from the plurality of anchor nodes and the third participating nodes, and determining a dimension of an E2E delay estimation coordinate system to be applied to current P2P networks by comparing the first control message overhead with the second control message overhead.

8. The method of claim 7, wherein control message exchange between the validation node and the origin node is performed using a first control message,
control message exchange between the validation node and the anchor nodes is performed using the first control message, and
control message exchange between the anchor nodes and the participating nodes is performed using a second control message.

9. The method of claim 8, wherein the first control message includes information representing a dimension, information representing a node index, information representing an event type, and information representing the number of referencing nodes.

10. The method of claim 9, wherein the event type is used for distinguishing between a control message for coordinate system construction and a control message for coordinate system management.

11. The method of claim 8, wherein the second control message includes information representing a message type and information representing a dimension.

12. The method of claim 7, further comprising requesting coordinate values of the validation node in the current P2P networks from the origin node after the coordinate systems are constructed, and updating coordinate values of the origin node when new coordinate values received from the origin node have a difference of a reference value or more from previous coordinate values.

13. A system for estimating an end-to-end (E2E) delay between blockchain nodes in a peer-to-peer (P2P) network comprising a processor connected to a memory for storing at least one instruction and configured to perform the at least one instruction, wherein the processor executes the at least one instruction to perform operations of:

setting a first participating node among a plurality of participating nodes which are blockchain nodes as an orderer node or an origin node;

transmitting first referencing node information to a plurality of anchor nodes selected from among the plurality of participating nodes;

receiving coordinate values and E2E delay measurement values from the plurality of anchor nodes;

transmitting second referencing node information to third participating nodes not belonging to the origin node or the plurality of anchor nodes among the plurality of participating nodes;

receiving coordinate values and E2E delay measurement values from the third participating nodes;

calculating a first control message overhead for a preset first dimensional coordinate system constructed on the basis of the coordinate values and the E2E delay measurement values received from the plurality of anchor nodes and the third participating nodes;

calculating a second control message overhead for a second dimensional coordinate system different from the first dimensional coordinate system constructed on the basis of the coordinate values and the E2E delay measurement values received from the plurality of anchor nodes and the third participating nodes; and determining a dimension of an E2E delay estimation coordinate system to be applied to current P2P networks by comparing the first control message overhead with the second control message overhead.

14. The system of claim 13, wherein the processor performs control message exchange between a validation node and the origin node using a first control message, performs control message exchange between the validation node and the anchor nodes using the first control message, and performs control message exchange between the anchor nodes and the participating nodes using the second control message.

15. The system of claim 14, wherein the first control message includes information representing a dimension, information representing a node index, information representing an event type, and information representing the number of referencing nodes.

16. The system of claim 15, wherein the event type is used for distinguishing between a control message for coordinate system construction and a control message for coordinate system management.

17. The system of claim 14, wherein the second control message includes information representing a message type and information representing a dimension.

18. The system of claim 13, wherein the processor further performs an operation of requesting coordinate values thereof in the current P2P networks from the origin node after the coordinate systems are constructed, and updating coordinate values of the origin node when new coordinate values received from the origin node have a difference of a reference value or more from previous coordinate values.

* * * * *